Aug. 10, 1943.     E. ESCHELBACHER     2,326,131
CLEAR VISION STEERING WHEEL
Filed April 23, 1942     2 Sheets-Sheet 1

INVENTOR
Emanuel Eschelbacher
BY
ATTORNEY

Aug. 10, 1943.  E. ESCHELBACHER  2,326,131
CLEAR VISION STEERING WHEEL
Filed April 23, 1942  2 Sheets-Sheet 2

INVENTOR
Emanuel Eschelbacher
BY
ATTORNEY

Patented Aug. 10, 1943

2,326,131

UNITED STATES PATENT OFFICE 2,326,131

CLEAR VISION STEERING WHEEL

Emanuel Eschelbacher, New York, N. Y.

Application April 23, 1942, Serial No. 440,181

7 Claims. (Cl. 74—493)

This invention relates to new and useful improvements in a clear vision steering wheel.

More specifically, the invention contemplates the construction of a rim type steering wheel having a front section of its rim pivotally mounted and adapted to be hinged downwards.

The invention contemplates a novel means for holding hinged section in its normal raised position.

Furthermore, the invention contemplates a novel means by which the hinged section may be lowered.

An important feature of the invention resides in the fact that when the hinged front section of the rim is lowered there is a clear view over the steering wheel.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
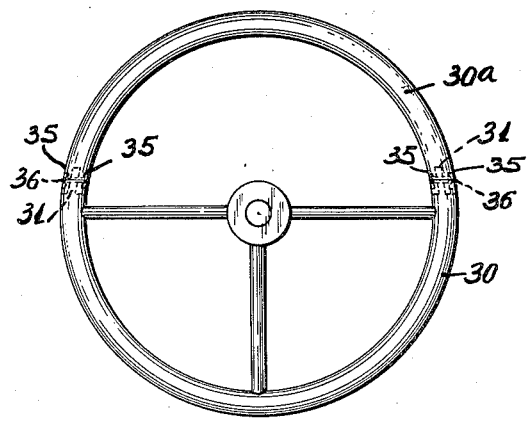
Fig. 1 is a plan view of a clear vision steering wheel constructed in accordance with this invention.
Figure 2:
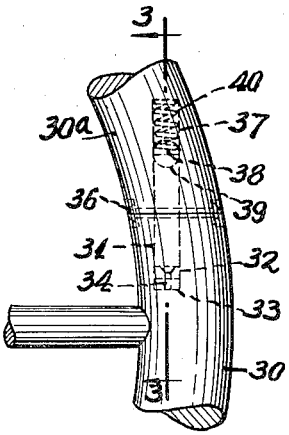
Fig. 2 is an enlarged detailed view of a portion of Fig. 1.
Figure 5:
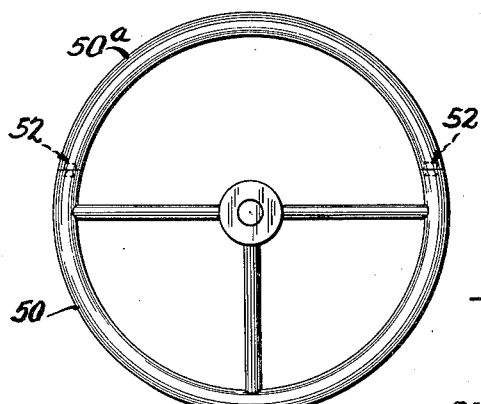
Fig. 5 is a plan view of a clear vision steering wheel constructed in accordance with a modification of this invention.
Figure 3:
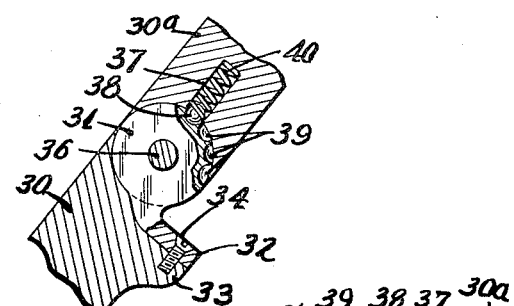
Fig. 3 is a fragmentary vertical sectional view taken on the line 3—3 of Fig. 2.
Figure 4:
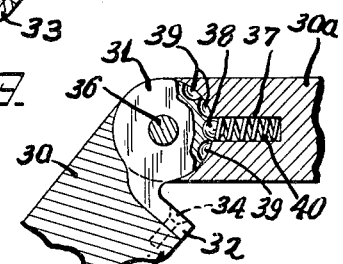
Fig. 4 is a view similar to Fig. 3 but illustrating the parts in a different position.
Figure 6:
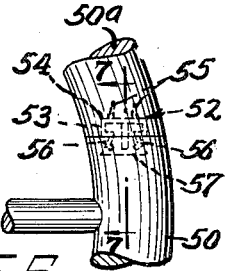
Fig. 6 is an enlarged detailed view of a portion of Fig. 5.

The clear vision steering wheel, according to this invention, includes a steering wheel 30 having a separate front section 30ª. The steering wheel 30 is of the rim type and when the adjacent ends of the body of the steering wheel and the front section are in alignment, which is the normal operative position of the front section 30ª, a complete circular wheel is formed.

Means is provided for pivotally supporting the front section 30ª of the steering wheel to pivot downwards to an inoperative position. This means comprises a disc 31 which is fixedly mounted upon the steering wheel 30. The disc 31 is formed with a projecting lug 32 which projects to the exterior of the wheel 30 and along a boss 33 formed on the wheel 30. A screw 34 passes through the lug 32 and into the boss 33 for holding the disc 31 in position upon the wheel 30.

The front section 30ª of the wheel 30 is formed with a pair of spaced fingers 35 which extend along and are in face engagement with the sides of the disc 31. A pin 36 engages through the overlapping portions of the fingers 35 and the disc 31 for pivotally supporting the front section 30ª on the disc 31 which is in turn fixedly mounted upon the wheel 30.

Another means is provided for holding the front section 30ª in its normal operative position or in one of several downwardly extended inoperative positions relative to the fixedly mounted disc 31. The end of the front section 30ª is formed with a recess 37 which extends radially of the disc 31. A ball 38 is mounted slidably within the recess 37 and is engageable with one of a plurality of complementary semi-circular cutouts 39 formed in the periphery of the disc 31. An expansion spring 40 operates between the ball 38 and the back end of the recess 37 for urging the ball into engagement with one of the cutouts 39. The construction is so arranged that when the front section is manually pivoted the ball 38 jumps from cutout 39 to cutout until the desired adjusted position is reached and then the ball nestles within the adjacent cutout 39 and the spring 40 retains the ball in position to held the front section 30ª in the desired adjusted position.

When the method of connecting the front section 30ª to the steering wheel has been described in the singular with particular reference to one end only the method of connecting is the same for both ends of the front section 30ª.

In the form of the invention shown in Figs. 5 to 8 a rim type steering wheel 50 is shown. This steering wheel 50 has a separate front section 50ª having a normal operative, in which it completes the circular formation of the wheel and an inoperative downwardly extending position. Hinges 51 pivotally connect the ends of the front section 50ª with the ends of the steering wheel 50 so that the front section will be capable of being pivoted from the operative to the inoperative position and vice versa.

A releasable means is provided for holding the front section 50ª in its normal operative position. This means comprises a spring clip 52 mounted within an opening 53 formed in each end of the front section 50ª. Each spring clip 52 comprises a disc 54 secured to the base of the respective opening 53 by means of screws 55. Fingers 56 project from the periphery of the discs 54 and have their ends projected beyond the ends of the front section 50ª. The ends of the fingers 56 are shaped to grip the walls of a frusto-conically shaped recess 57 formed in the ends of the steering wheel 50.

Figures 7, 8:
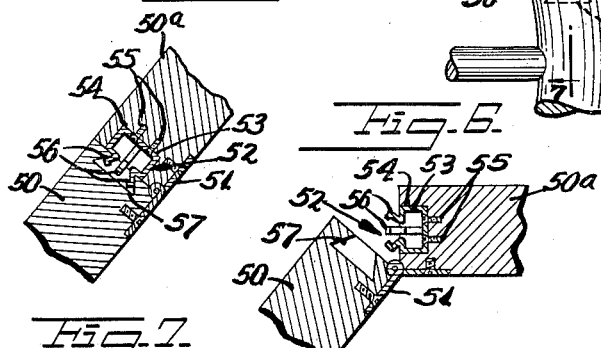
Fig. 7 is a fragmentary vertical sectional view taken on the line 7—7 of Fig. 6.
Fig. 8 is a view similar to Fig. 7 but illustrating the parts in a different position.
Figure 9:
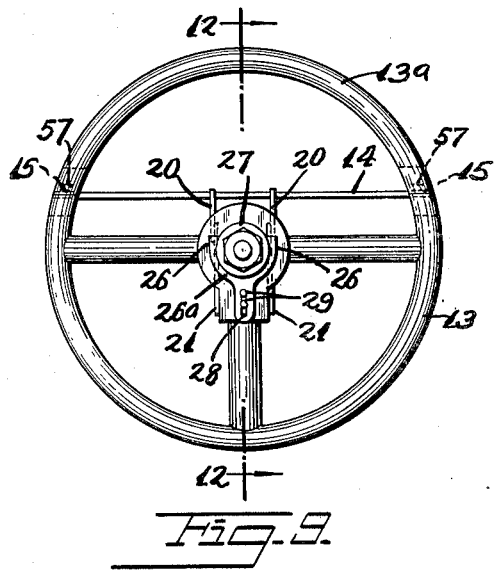
Fig. 9 is a plan view of a clear vision steering wheel constructed in accordance with a still further modification of this invention.

The engaged position of the fingers 56 of the spring clips 52 with the recesses 57 of frusto-conical shape is illustrated in Fig. 7. When pressure is applied in a downward direction the fingers 56 snap out of the recess 57 freeing the front section 50ª to pivot in a downward direction. When the front section 50ª is returned to its normal operative position again the fingers 56 will snap into the opening 57 for locking the front section 50ª in its operative position.

Figure 10:
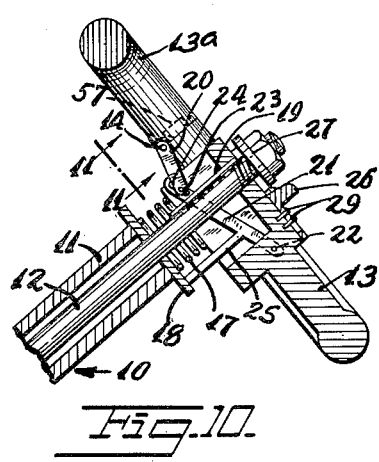
Fig. 10 is a fragmentary enlarged vertical sectional view taken on the line 10—10 of Fig. 9.
Figure 12:
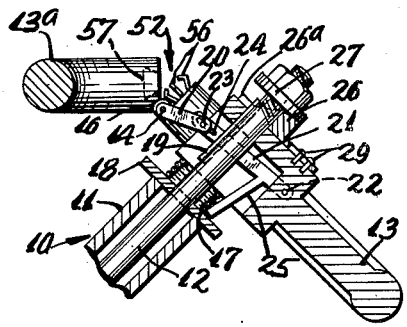
Fig. 12 is a sectional view similar to Fig. 10 but illustrating the parts in a different position.
Figure 13:
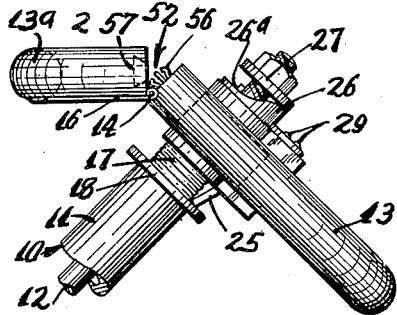
Fig. 13 is a side elevational view of the wheel in the position shown in Fig. 12.
Figure 11:
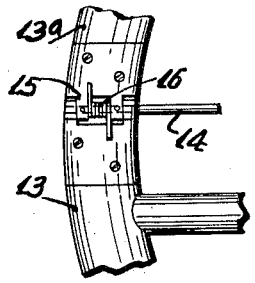
Fig. 11 is a fragmentary enlarged elevational view looking in the direction of the line 11—11 of Fig. 10.

The clear view steering wheel, according to the form of the invention shown in Figs. 9 to 13, is used in combination with a steering column 10 having a stationary tubular casing 11 through which the steering shaft 12 passes. A rim type steering wheel 13 is keyed on the said shaft 12 and is slidable for a short distance thereon and has a front section 13ª pivotally mounted so as to be capable of hinging downwards. In Fig. 10 the hinged front section 13ª is shown in its raised normal position. In Fig. 12 it is shown hinged to its downward position in which condition the view over the steering wheel is unimpeded.

The hinged section 13ª of the steering wheel is fixedly mounted upon a rod 14 coaxial with the hinge construction of the rim section. The hinge construction is indicated by reference numerals 15. When the front section 13ª is moved on its hinges the rod 14 turns correspondingly.

Means is provided for holding the front section 13ª of the rim of the steering wheel in its raised normal condition. This means comprises springs 16 coaxially mounted upon the end portions of the rod 14 and acting between the adjacent ends of the hinged section 13ª and the remaining rim portion of the steering wheel. Means is also provided for hinging the front section 13ª of the rim of the steering wheel downwards when the steering wheel 13 is moved downwards. Normally, the steering wheel 13 is urged upwards by an expansion spring 17 which is coaxially mounted about the shaft 12 and which acts between a washer 18 mounted across the tubular casing 11, and the bottom face of the hub of the steering wheel 13. Reference numeral 19 indicates the key which slidably connects the steering wheel 13 to the shaft 12.

Radial arms 20 are fixedly mounted on the rod 14 and project towards and to the sides of the shaft 12. Levers 21 are pivotally mounted at their rear ends by pintles 22 and are connected with the rear ends of the arms 20. These connections are accomplished by pins 23 mounted on the arms 20 which engage slots 24 formed in the ends of the levers 21. Each of the levers 21 is provided with a projection 25 which normally engages against the washer 18.

There is latch means by which the steering wheel 13 may be latched in its depressed condition. This means comprises a cam 26 which is slidably mounted on the hub portion of the steering wheel 13 and which is capable of being moved forwards and rearwards, as desired. This cam 26 has a U-shaped front end 26ª which engages beneath a top washer 27 mounted on the steering shaft 12. The rear end of the cam 26 is formed with a slot 28 through which holding pins 29 pass. These pins 29 limit motion of the cam 26 to a forward and rearward direction.

The operation of the device is as follows:

With the parts as illustrated in Fig. 10 the steering wheel 13 may be turned in the usual way for the steering operation. If it is desired to lower the front portion 13ª of the rim of the steering wheel 13 to clear the vision over the steering wheel it is merely necessary to press the steering wheel 13 downwards. This compresses the spring 17. Simultaneously, the levers 21 will move relatively upwards in relation to the downwards position of the steering wheel 13. This moves the arms 20 relatively upwards and causes the front section 13ª of the steering wheel to pivot downwards.

The steering wheel may be released and then the spring 17 will move it back to the original position which raises the front section 13ª of its rim. Or, the cam 26 may be moved forwards to the position shown in Fig. 12 in which, the raised portion of the cam engages beneath the washer 17, holding the parts in a position in which the front section 13ª of the rim of the steering wheel is in its down position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards.

2. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel.

3. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel, and a rod fixedly connected with the hinged front section of the rim of the steering wheel and located coaxially with the hinge thereof.

4. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel, and a rod fixedly connected with the hinged front section of the rim of the steering wheel and located coaxially with the hinge thereof, said means for hinging the front section of the rim as stated comprises radial arms projecting from said rod, levers pivotally mounted on the main portion of the steering wheel and having projections engaging a washer mounted across the top of said tubular casing, said levers being connected with said arms, whereby when the steering wheel is depressed the arms will be moved to hinge the front section downwards.

5. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel, and a rod fixedly connected with the hinged front section of the rim of the steering wheel and located coaxially with the hinge thereof, said means for hinging the front section of the rim as stated comprises radial arms projecting from said rod, levers pivotally mounted on the main portion of the steering wheel and having projections engaging a washer mounted across the top of said tubular casing, said levers being connected with said arms, whereby when the steering wheel is depressed the arms will be moved to hinge the front section downwards, and resilient means urging said steering wheel into its raised position.

6. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel, and a rod fixedly connected with the hinged front section of the rim of the steering wheel and located coaxially with the hinge thereof, said means for hinging the front section of the rim as stated comprises radial arms projecting from said rod, levers pivotally mounted on the main portion of the steering wheel and having projections engaging a washer mounted across the top of said tubular casing, said levers being connected with said arms, whereby when the steering wheel is depressed the arms will be moved to hinge the front section downwards, and resilient means urging said steering wheel into its raised position, and means for latching said steering wheel in its depressed condition.

7. In a steering column having a stationary tubular casing through which the steering shaft passes, a rim type steering wheel keyed on said shaft and slidable for a short distance thereon and having the front section of its rim pivotally mounted to hinge downwards, means for holding said front section of the rim of said steering wheel in its raised normal position, and means for hinging said front section of the rim of said steering wheel downwards upon moving said steering wheel downwards, said first-named means comprising springs acting between the hinged front section and the remaining portions of the rim of the steering wheel, and a rod fixedly connected with the hinged front section of the rim of the steering wheel and located coaxially with the hinge thereof, said means for hinging the front section of the rim as stated comprises radial arms projecting from said rod, levers pivotally mounted on the main portion of the steering wheel and having projections engaging a washer mounted across the top of said tubular casing, said levers being connected with said arms, whereby when the steering wheel is depressed the arms will be moved to hinge the front section downwards, and resilient means urging said steering wheel into its raised position, and means for latching said steering wheel in its depressed condition, said latter means comprising a cam mounted on the steering wheel and having a raised portion engageable beneath a washer mounted on the end of said steering shaft to hold the steering wheel depressed.

EMANUEL ESCHELBACHER.